No. 627,969. Patented July 4, 1899.
J. BENNINGTON.
WIRE FENCE MACHINE.
(Application filed Apr. 13, 1899.)
(No Model.)
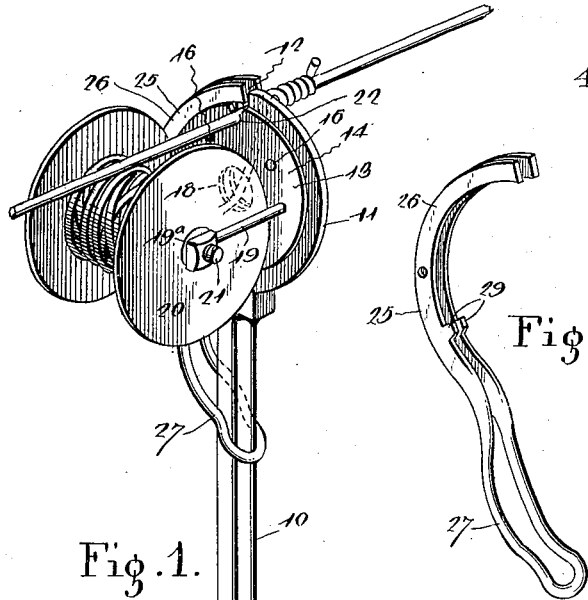
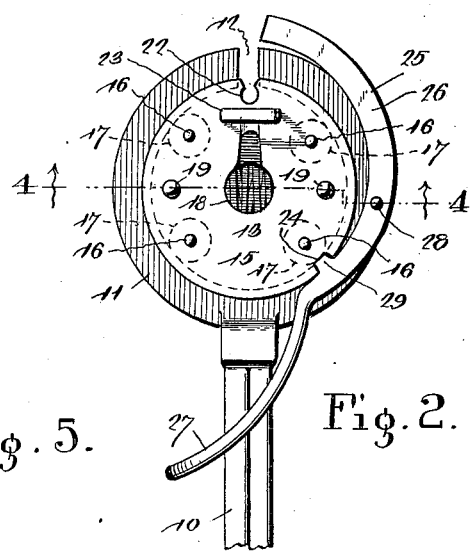
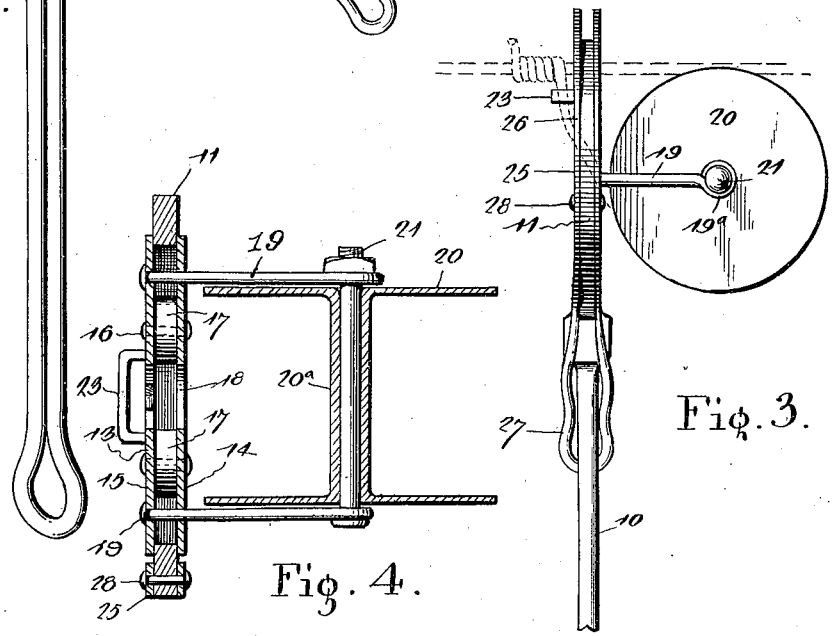
John Bennington, Inventor.
Witnesses

UNITED STATES PATENT OFFICE.

JOHN BENNINGTON, OF FOUTS, OKLAHOMA TERRITORY.

WIRE-FENCE MACHINE.

SPECIFICATION forming part of Letters Patent No. 627,969, dated July 4, 1899.

Application filed April 13, 1899. Serial No. 712,870. (No model.)

*To all whom it may concern:*

Be it known that I, JOHN BENNINGTON, a citizen of the United States, residing at Fouts, in the county of Lincoln and Territory of Oklahoma, have invented a new and useful Wire-Fence Machine, of which the following is a specification.

My invention relates to implements for applying stay-wires to the stretched lateral or strand wires of a fence; and one object in view is to provide a simple and compact implement by which the stay-wire may be firmly and rapidly attached to the lateral wires.

A further object of the invention is to construct the implement in a manner to effect the rotation of the twister-head by changes in the line of endwise pressure applied through the medium of the handle-bar, and said revoluble twister is mounted loosely in a roller or ball bearing of the handle-bar for rotation freely therein to minimize the friction and wear between the parts.

My improved implement has a pressure bar or handle provided with a radially-slotted track-ring, within which the twister-head is mounted by ball or roller bearings for free rotation around an axis afforded by the lateral wire to which the implement is applied. Said twister has a notch to receive the lateral wire, and adjacent to this notch is provided a coiling-finger for engagement with the stay-wire, so as to carry the latter around the lateral wire to firmly unite one wire to the other. The twister is also furnished with a central wire-opening and with means for supporting the stay-wire bobbin, so that the bobbin will rotate with the twister. With the handle-bar and the twister is combined a locking device arranged for service to close the slot of the track-ring when said locking device is in one position and the implement is in service to prevent the separation of the implement from the lateral fence-wire, and said locking device is also adapted to have interlocking engagement with the twister-head when the slot in the track-ring is open, so that the twister-head is locked against rotation within the track-ring when the implement is shifted from one strand-wire to the other, while at the same time the bobbin is free to rotate in order to pay out the stay-wire which is coiled on said bobbin.

My implement is free from ratchet devices and gear appliances for operation by hand to effect the rotation of the twister-head, thus simplifying the construction of the implement and also leaving both hands of the operator free to shift the structure from one lateral wire to the other.

To the accomplishment of these ends my invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1 is a perspective view of a stay-wire-applying device embodying the invention and illustrating the same in operative relation to a lateral stretched fence-wire. Fig. 2 is a side elevation with the locking-latch adjusted to engage with the twister-head. Fig. 3 is an edge view of the implement. Fig. 4 is a transverse section through the twister-head and the bobbin carried thereby, the plane of section being indicated by the dotted line 4 4 of Fig. 2. Fig. 5 is a detail perspective view of the latch.

The same numerals of reference are used to indicate like and corresponding parts in each of the several figures of the drawings.

10 designates the pressure or handle bar, which is furnished or constructed at one end with an annular track or ring 11. As shown by the drawings, the track-ring and the handle-bar are made of a single piece of metal, and to permit the implement to be readily applied to a stretched lateral wire the track-ring is formed with a radial notch 12, which is preferably disposed in the plane of the longitudinal axis of the handle-bar.

13 designates a revoluble twister-head, which is mounted within the track-ring for rotation freely therein. In one embodiment of the twister-head it consists of a pair of parallel plates 14 15, which are joined or connected together by a series of pins or bolts 16. The face-plates are applied laterally against the faces of the track-ring 11 in order to overlap the latter, and said face-plates are joined by disposing the pins or bolts 16 within the circular outline on the inner edge of the track-ring. The plates forming the twister-head are mounted to rotate freely on the track-ring by providing a series of rollers 17, which are journaled on the pin or bolts 16 in positions to engage with and travel on the inner edge of the ring 11; but in lieu of using the rollers mounted on the pins or bolts I may substitute bearing-balls for said rollers and fashion the face-plates 14 15 to retain the bearing-balls in proper operative relation to the track-ring 11.

I do not desire to strictly confine myself to the two-part construction of the revoluble twister-head, because I am aware that the track-ring may be provided with an interior annular groove to receive the bearing-balls and that a single plate may be mounted within the track-ring and in proper relation to the ball or roller bearing thereof.

The twister-head is provided with a central transverse opening 18, adapted to permit of the free passage of the stay-wire, which is coiled on a bobbin or spool. This bobbin or spool is supported directly on the twister-head at one side of the handle-bar 10 by providing supporting-arms 19, which are fast or integral with the twister-head. The supporting-arms extend laterally from the twister-head, and at their outer ends said arms are provided with transverse eyes 19ᵃ, which are disposed in alinement with each other. The bobbin or spool 20 has a tubular shaft 20ᵃ, through which is passed the bolt or spindle 21, that is attached to the arms 19, said bolt or spindle passing through the eyes 19ᵃ of the supporting-arms. The described construction and the means for supporting the bobbin permit the bolt or spindle 21 to be removed from the eyes of the supporting-arms, and the bobbin may thus be disconnected from the twister-head for the purpose of replacing an empty bobbin with another filled bobbin having a proper supply of wire to form the stays of the fence. The revoluble head is also provided with a radial curved notch 22, which is formed in the edge of the head adjacent to the track-ring, and this notch 22 is of such depth as to permit the lateral wire to fit in the notch without engaging with the inner edge of the track-ring. The revoluble twister-head carries a coiling-finger 23, which is united securely to the head in order to protrude from one side or face thereof, and this coiling-finger occupies a position between the wire-notch 22 and the transverse aperture 18 of the twister-head. The coiling-finger is disposed on the opposite face or side of the twister-head from the bobbin 20, and, as shown by the drawings, this coiling-finger 23 is in the form of a staple or keeper which is disposed in close relation to the notch 22, that receives the lateral wire.

The twister-head of my implement is provided with a locking contrivance that is fulcrumed on the track-ring 11 in a manner to close the slot 12 of said track-ring when the locking contrivance is free from engagement with the twister-head; but a reverse adjustment of this locking contrivance opens the radial slot of the track-ring and makes the lock engage with the twister-head to prevent said head from rotating on its axis.

The locking-notch 24 is formed in the edge of the twister-head at a proper distance from the wire-notch 22, so that when the twister-head occupies a position for its wire-notch to aline with the radial slot 12 the locking-notch 24 will lie directly opposite the shoulders or lugs of a locking contrivance for the latter to engage with said notch 24. The latch 25 is curved for a part of its length, as at 26, and for the remainder of its length said latch is formed with a loop 27. The looped part of the latch is slipped over the handle-bar 10 in order to permit the latch to have the desired movement or play, and this latch is fulcrumed at a point intermediate its length on the track-ring 11 by a transverse pivot-pin 28. The curved part 26 of the latch fits closely to the track-ring, and its extremity is contiguous to the radial slot 12 of the track-ring. In one position of the latch the looped end 27 thereof abuts against the handle-bar, while its opposite curved extremity is projected across the notch 12 in the track-ring for the purpose of closing said notch and preventing the implement from being disengaged from the lateral fence-wire, whereby the latch serves to confine the implement in proper operative relation to the fence-wire for applying the stay-wire thereto. The latch is furnished with the inwardly-projecting shoulders or lugs 29 at one side of the pivotal point 28 of said latch, and these lugs are so positioned on the latch as to engage with the notch 24 of the twister-head when the latter occupies a position within the track-ring for the wire-notch 22 to aline with the radial notch 12, whereby the latch is adapted to restrain the twister-head from rotation within the track-ring. The interlocking engagement between the latch and the twister-head is especially advantageous when removing the implement from one line-wire and adjusting said implement into engagement with the other line-wire, and during such adjustment of the implement the bobbin or spool 20 is free to rotate on the spindle or bolt 21 for the purpose of uncoiling the stay-wire from said bobbin to pay out a proper length of the stay-wire for spanning the space between two adjacent line-wires.

In the operation of the implement the bobbin filled with a proper quantity of wire is fitted in the supporting-arms 19 and supported thereon by the bolt 21. The wire from this spool is led through the central aperture 18 and the staple-like coiling-finger 23. Previous to adjusting the implement to a stretched lateral fence-wire the latch is moved on its pivot to open the radial slot 12 in the track-ring, and this adjustment of the latch moves its shoulders or lugs 29 into engagement with the notched edge of the twister-head. The implement may be fitted to the lateral wire, so that said wire will pass through the slot 12 and enter the wire-notch 22 of the twister-head. The operator now moves the latch for its free extremity to extend across the slot and confine the implement on the lateral wire, and this adjustment of the latch withdraws the shoulders or lugs 29 from the notch 24 of said head. In order to rotate the twister-head, the operator shifts or changes the position of the handle-bar with relation to the twister-head and to bring the line of pressure of the handle-bar 10 at an angle to the wire-notch in said twister-head. This pressure of the handle-bar and the track-ring 11 thereof on the twister-head turns said head, which is mounted for rotation freely in the track-ring, and as the head starts to turn so as to bring the wire-notch into line with the handle-bar the position of the latter is again changed, while the endwise pressure is still continued to be applied, so that the head will continue to turn. The movement of the bar and the track-ring causes the head to turn around the lateral wire which forms the axis of rotation of said twister-head, and the constant shifting of the bar by the operator causes the line of force applied to the revoluble head to effect the continuous rotation thereof. The head may be rotated any desired number of times by manipulating and pressing on the handle-bar in the manner described, and during the rotation of the head the stay-wire is drawn from the spool or bobbin and is twisted a desired number of times around the stretched line-wire. In the operation of applying the stay-wire to the lateral or line wire the coiling-finger or keeper exerts pressure on the stay-wire to wrap the latter closely and tightly around the lateral wire, and the bobbin is free to rotate on its axis for the purpose of paying out the stay-wire.

In manipulating my implement the handle-bar and its track-ring are not moved or turned around the lateral or stay wire, but, as before indicated, pressure is constantly applied in an endwise direction on the handle-bar, and the latter is constantly shifted or changed with relation to the axis of the twister-head, so that the twister-head may be rotated continuously in one direction.

Previous to removing the implement from the lateral or line wire after the stay-wire shall have been coiled a desired number of times thereon the operator adjusts the latch to retract its free end from the slot and move the shoulders or lugs into engagement with the notch 24 of the twister-head, and in this position of the twister-head the wire-notch 22 thereof coincides with the radial slot 12 in the ring. The implement may now be retracted or withdrawn from the lateral wire and adjusted to the next lateral or line wire, and during the shifting adjustment of the implement the twister-head is held in a stationary position by the latch while the bobbin is free to rotate on its axis to pay out the stay-wire.

The operation of applying the stay-wire to the line-wires is repeated throughout the height of the fence, and after the stay-wire shall have been applied to the last lateral wire said stay-wire may be cut off, or, if desired, the implement may be moved along the last lateral wire to the proper position for applying the next stay-wire to the fence.

My implement is exceeding simple in construction and it is light and easily manipulated. It requires no gearing mechanism or ratchet mechanism for effecting the positive rotation of the twister-head, and hence the construction is simplified and the weight reduced as compared with some of the prior devices well known to the art. The coiling-finger or keeper is especially advantageous in my device because it insures the tight twisting of the stay-wire with the lateral wire and dispenses with the employment of a tension device for the spool or bobbin.

Changes in the form, proportion, size, and the minor details of construction within the scope of the appended claims may be resorted to without departing from the spirit or sacrificing any of the advantages of this invention.

What I claim is—

1. A stay-wire-applying implement consisting of a handle-bar having a divided track-ring, a twister-head mounted for rotation freely within said track-ring, and a bobbin supported on the twister-head to rotate therewith and also capable of rotating on its axis independently of the twister-head; said handle-bar being shifted with relation to a wire-receiving notch of the twister-head and adapted to apply pressure against the twister-head for rotating the latter on an axis afforded by the lateral fence-wire, substantially as and for the purpose described.

2. A stay-wire-applying implement comprising a handle-bar having a divided track-ring, and a twister-head mounted within said track-ring for rotation freely therein and provided with a wire-receiving notch in its peripheral edge; said handle-bar being shiftable with relation to the wire-notch of the twister-head and capable of applying pressure at different angles to the twister-head for rotating the latter continuously in one direction, substantially as described.

3. A stay-wire-applying implement consisting of a handle-bar provided with a divided track-ring, a twister-head mounted in said track-ring for rotation freely therein and provided with a transverse notch in its periphery, and a coiling-finger fast with the twister-head at a point adjacent to the wire-notch thereof, substantially as described.

4. A stay-wire-applying implement consisting of a pressure-bar having a divided track-ring, a revoluble twister-head mounted in said track-ring for rotation freely therein and provided with a central aperture and with a wire-notch in its periphery, a coiling-finger fast with the twister-head between its central aperture and the wire-notch, and a bobbin mounted on the twister-head to rotate therewith, substantially as described.

5. A stay-wire-applying implement consisting of a pressure-bar having a divided track-ring, a twister-head mounted in said track-ring for rotation freely therein and provided in its periphery with a transverse notch, a locking device arranged to engage with the twister-head to restrain the latter from rotation within the track-ring, and a bobbin mounted on the twister-head, substantially as described.

6. A stay-wire-applying implement comprising a handle-bar provided with a divided track-ring, a twister-head mounted within said track-ring and having a transverse peripheral notch, and a locking-latch mounted on the handle-bar to be projected across the divided part of the track-ring, said latch adapted to have interlocking engagement with the twister-head when the notch of said head coincides with the division in the track-ring, substantially as described.

7. A stay-wire-applying implement comprising a pressure-bar having the divided track-ring, a twister-head mounted for rotation freely within said track-ring and having the transverse peripheral wire-notch and the locking-notch in spaced relation to the wire-notch, and a latch pivoted at a point intermediate its length to the track-ring for its free end to be projected across the division thereof and having the loop at its opposite end to engage with the pressure-bar, said latch being also provided with shoulders or lugs arranged to engage with the locking-notch of the twister-head when the latter assumes a position within the track-ring for its wire-notch to coincide with the division of the track-ring, substantially as and for the purpose described.

In testimony that I claim the foregoing as my own I have hereto affixed my signature in the presence of two witnesses.

JOHN BENNINGTON.

Witnesses:
JOHN P. TRYON,
J. J. RATHBUN.